(12) United States Patent
Anderson et al.

(10) Patent No.: US 10,783,807 B2
(45) Date of Patent: Sep. 22, 2020

(54) ADHESIVE PATCH WITH VOIDS

(71) Applicant: Iconex LLC, Duluth, GA (US)

(72) Inventors: Austin Daniel Anderson, Dacula, GA (US); Stephen Cameron Van Winkle, Lawrenceville, GA (US); Tom Edward Zagaya, Knoxville, TN (US)

(73) Assignee: Iconex LLC, Duluth, GA (US)

( * ) Notice: Subject to any disclaimer, the term of this patent is extended or adjusted under 35 U.S.C. 154(b) by 624 days.

(21) Appl. No.: 14/928,525

(22) Filed: Oct. 30, 2015

(65) Prior Publication Data

US 2017/0124920 A1     May 4, 2017

(51) Int. Cl.
*G09F 3/10* (2006.01)
*G09F 3/00* (2006.01)
*G09F 3/02* (2006.01)

(52) U.S. Cl.
CPC .............. *G09F 3/10* (2013.01); *G09F 3/0288* (2013.01); *G09F 2003/023* (2013.01); *G09F 2003/0248* (2013.01)

(58) Field of Classification Search
CPC ................................................ G09F 2003/0248
See application file for complete search history.

(56) References Cited

U.S. PATENT DOCUMENTS

| | | | |
|---|---|---|---|
| 1,922,565 A * | 8/1933 | Adair | G09F 3/0289 229/201 |
| 2,399,545 A * | 4/1946 | Davis | C09J 7/04 602/55 |
| 2,510,120 A * | 6/1950 | Leander | C09J 7/21 428/191 |
| 3,741,786 A * | 6/1973 | Torrey | C09J 7/20 428/41.9 |
| 4,711,237 A | 12/1987 | Kaiser | |
| 5,702,789 A | 12/1997 | Fernandez-Kirchberger et al. | |
| 5,782,496 A | 7/1998 | Casper et al. | |
| 6,500,293 B1 | 12/2002 | Dexter | |
| 10,176,731 B2 * | 1/2019 | Hill | C09J 7/20 |
| 2002/0142156 A1 | 10/2002 | Maloney | |
| 2003/0031836 A1 * | 2/2003 | Iwami | C09J 7/20 428/194 |
| 2004/0128893 A1 | 7/2004 | Caveney et al. | |
| 2004/0166286 A1 | 8/2004 | Auchter et al. | |
| 2008/0187715 A1 * | 8/2008 | Wang | B32B 5/18 428/118 |
| 2009/0169282 A1 * | 7/2009 | Keeton | B41J 2/32 400/120.01 |
| 2011/0061802 A1 | 3/2011 | Raming | |
| 2011/0205326 A1 * | 8/2011 | Roth | B41J 2/32 347/171 |
| 2013/0330494 A1 | 12/2013 | Yano | |
| 2015/0161916 A1 | 6/2015 | Wild et al. | |

FOREIGN PATENT DOCUMENTS

WO   WO-2017/075280 A1   5/2017

OTHER PUBLICATIONS

Definition "thermoplastic", Merriam-Webster dictionary, retrieved on Oct. 29, 2018 (Year: 2018).*
Definition of "stagger" from Merriam-Webster dictionary, retrieved on Aug. 20, 2019 (Year: 2019).*
"International Application Serial No. PCT/US2016/059210, International Search Report dated Jan. 3, 2017", 2 pgs.
"International Application Serial No. PCT/US2016/059210, Written Opinion dated Jan. 3, 2017", 5 pgs.
"European Application Serial No. 16860833.9, Extended European Search Report dated Oct. 2, 2018", 9 pgs.

* cited by examiner

*Primary Examiner* — Anish P Desai
(74) *Attorney, Agent, or Firm* — Schwegman Lundberg & Woessner, P.A.

(57) ABSTRACT

An adhesive patch is provided. The adhesive patch includes an adhesive region with adhesive and a void region devoid of any adhesive.

5 Claims, 6 Drawing Sheets

```
                    FAST FOOD RESTAURANT
                                              202

ITEMS:

HAMBURGER                       $2.90
LARGE FRIES                     $0.99
SMALL MILKSHAKE                 $0.99

TOTAL:            $4.88
              CASH:             $5.00
              CHANGE:           $0.12
```

ADHESIVE PATCH WITH VOIDS

BACKGROUND

The ubiquitous adhesive label is available in a myriad of configurations for use in various applications, including specialty applications. The typical adhesive label includes pressure-sensitive adhesive on its back side and is initially laminated to an underlying release liner.

Adhesive labels may be found in individual sheets, or joined together in a fan-fold stack, or in a continuous roll (web). Label rolls are typically used in commercial applications requiring high volume use of labels.

The challenge with adhesive-based printing applications is that too much adhesive applied to a label can over time collect on mechanical components of the printer during printer operation. So, any label having an adhesive coating that is fed through a printer can interfere with print quality and cause printer jams.

Moreover, during manufacture of the adhesive label rolls repeated placement of the adhesive patch in a same amount and in a same location with each label can result in wrinkling of the web and/or ridges forming as the web is wound onto the reel.

Still further, when labels are applied to items (after printing and removal from the web), the labels can lip up (flag or flare) along their perimeters resulting in some cases in the labels falling off the items to which they are applied. In some instances, these types of problematic labels can also interfere with other materials added to the items, such as a coffee collar slipped over a cup of coffee where the label faring prevents the coffee collar from properly fitting over the cup.

Therefore, it would be desirable to provide an improved adhesive patch.

SUMMARY

In various embodiments, an adhesive path with one or more voids and methods of applying the patch to a label are provided.

According to an embodiment, an adhesive patch is provided. The adhesive patch includes an adhesive region with adhesive and a void region devoid of any adhesive.

DETAILED DESCRIPTION

Figure 1A:
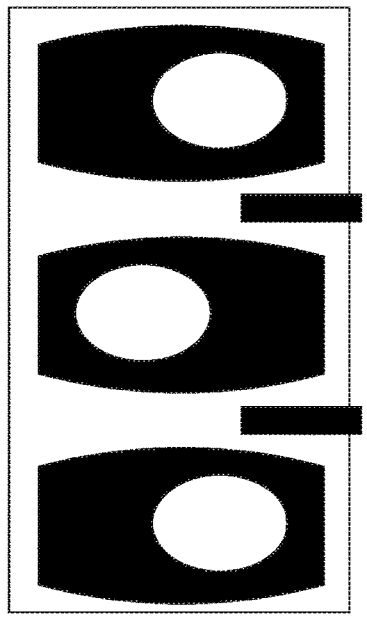
FIG. 1A is a diagram of adhesive patches with staggering voids applied to labels in a web, according to an example embodiment.

As will be described more completely herein and below, the adhesive with void(s) improves paper feed for printers and other performance and processing properties for thermal-printed, labels, linerless labels, and related products.

The term "Sticky Media" refers to a paper product (such as a label or linerless label) featuring a thermal top coating (i.e. a coating that darkens when exposed to heat, known as a "thermal coating") and a pressure sensitive adhesive (PSA) coated on the reverse side of a substrate. The thermal-coated top surface is over coated with low surface energy silicone (or silicone-free (water based) release agent/mixture) to allow the paper to release from itself when wound into a roll, without picking or causing other product defects in the media.

The adhesive patches with voids discussed herein enable a distribution of tack over a wider area of the backside of the labels (such as but not limited to receipts) while conserving the mass of the applied adhesive applied. When compared to a solid adhesive patch having a same perimeter, an adhesive patch with voids (as presented herein) maintains acceptable performance within a printer when a label is imaged while the adhesive void patch counters increase in binding that would occur with a solid adhesive patch having no voids within the printer.

Furthermore, in distinction with smaller solid adhesive patches, a larger adhesive patch with one or more internal voids is better able to distribute total adhesive mass over the backsides of labels and counters the tendency of the labels "flapping," "flagging," "flaring," "lipping up," of curling along the perimeters of the labels (such as receipts) when the labels are applied to a package or item.

The adhesive void patches (presented herein) provide a full coverage label function with less adhesive being required on the backside of the label. This provides value by decreasing the cost of glue required when manufacturing webs of the labels and provides a more environmentally friendly application, since less adhesive is used per label.

Additionally, staggering of the void regions from patch-to-patch improves machine runnability by inhibiting the tendency to form wrinkles in the machine direction aligned with the voids.

An adhesive patch with one or more voids (presented herein) is applied to a surface of print media. In an embodiment, these patches with voids may be of any geometric shape, of varying size, and applied in various patterns.

In an embodiment, the adhesive path with one or more voids employs a high-tack pressure sensitive adhesive.

In an embodiment, the adhesive path with one or more voids employs any pressure sensitive adhesive.

The adhesive patches with manufactured void areas (presented herein) enables the production of a superior label by enabling a larger backside adhesive coverage area in proximity to the label perimeter while utilizing a lesser amount of adhesive used in conventional small adhesive patch applications. This results in lower amounts of adhesive being required and reduces the cost of manufacture.

FIG. 1A is a diagram of adhesive patches with staggering voids applied to labels in a web, according to an example embodiment. The perimeter of the adhesive patch (gray area with white oval void) is in proximity to the perimeter of the label (each label on the web in the FIG. 1A separated by a back rectangular sense mark). The void area of the adhesive patch intersects a center of the label but does not completely overlap the center of the label. Moreover, the location of the void area varies from label to label (the first label having a void area offset about the center of the label to the right, the second label having a void area offset about the center of the label to the left, and the third label having a void offset area similar to that of the first label).

Having the void area in the adhesive patch vary from label to label and avoid ever completely overlapping void centers while still intersecting at least a portion of the center results in optimal machine performance at the rewind end of the machine. If the voids were all aligned, the rewind reel would tend to build ridges along the glue (adhesive) pattern that runs in the machine direction, the regions of adhesive that define the lateral perimeter of the patch. These ridges destabilize the roll.

Additionally, less margin between the adhesive patches with voids and the label perimeter is achievable with less adhesive being required, which creates better tack and reduces flagging and flaring when the labels are applied to packaging as receipts after being imaged by a printer and removed from the roll.

Still further, because less adhesive is used during manufacture of the web, there is less adhesive concentrated over the length of the web, which makes the web (roll) softer than conventional manufactured rolls and allows the web of the present teachings to be more easily unwound by a printer during receipt printing in a retail environment. This produces less wear and tear on the printer and printer components.

Also, the adhesive patch with void labels manufactured on the web require less drying energy because less adhesive is used than conventional adhesive patch applications. That is the amount of heat or the time to dry adhesive patches on labels is a function of the amount of adhesive being used per patch and since less adhesive per patch is required with the teachings presented herein, less heat and/or less drying time is required during label manufacture than conventional approaches.

Figure 1B:
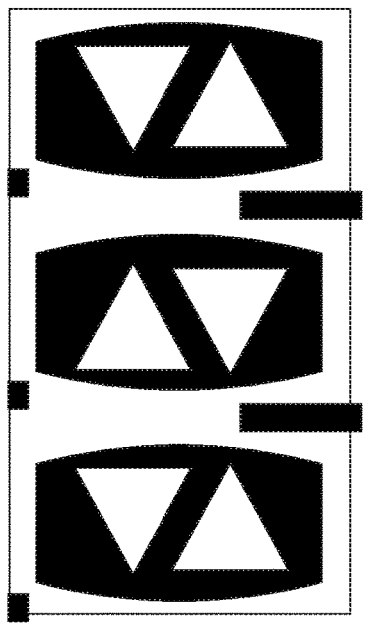
FIG. 1B is a diagram of other adhesive patches with staggering voids applied to labels in a web, according to an example embodiment.

FIG. 1B is a diagram of other adhesive patches with staggering voids applied to labels in a web, according to an example embodiment. FIG. 1B illustrates that multiple voids may appear within a single adhesive patch.

Figure 1C:
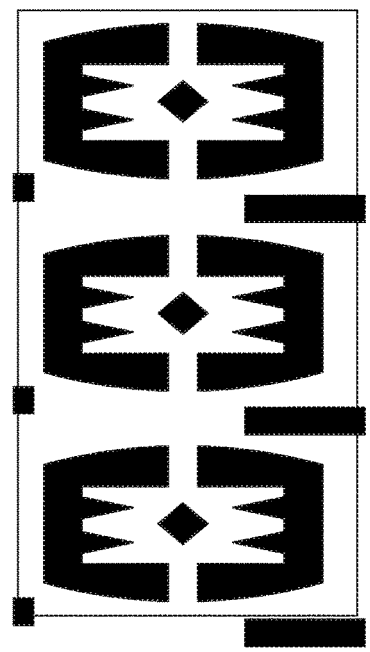
FIG. 1C is a diagram of adhesive patches with voids having a small amount of adhesive applied in the void region, the adhesive patches applied to labels in a web, according to an example embodiment.

FIG. 1C is a diagram of adhesive patches with voids having a small amount of adhesive applied in the void region, the adhesive patches applied to labels in a web, according to an example embodiment.

The adhesive patches with voids of the FIG. 1C include a small amount of adhesive within the center of the void (darkened diamond in the FIG. 1C, white area are void areas, darkened areas are adhesive areas).

The layout of the adhesive path with a void area having an additional amount of adhesive (as shown in the FIG. 1C) prevents bubbling of the label when it is affixed to packaging.

In an embodiment, the coverage area of adhesive within the adhesive patch having one or more voids is greater than the coverage area of the void(s) (as shown in the FIG. 1A).

In an embodiment, the coverage area of the adhesive within the adhesive patch having one or more voids is less than the coverage area of the void(s) (as shown in the FIG. 1B).

In an embodiment, the coverage area of the adhesive within the adhesive patch having one or more voids is substantially the same as the coverage area of the void(s).

In an embodiment, void geometric shape(s) within the adhesive patch with one or more voids is configurable and varies from label to label during manufacture of a web of labels.

Figure 2:
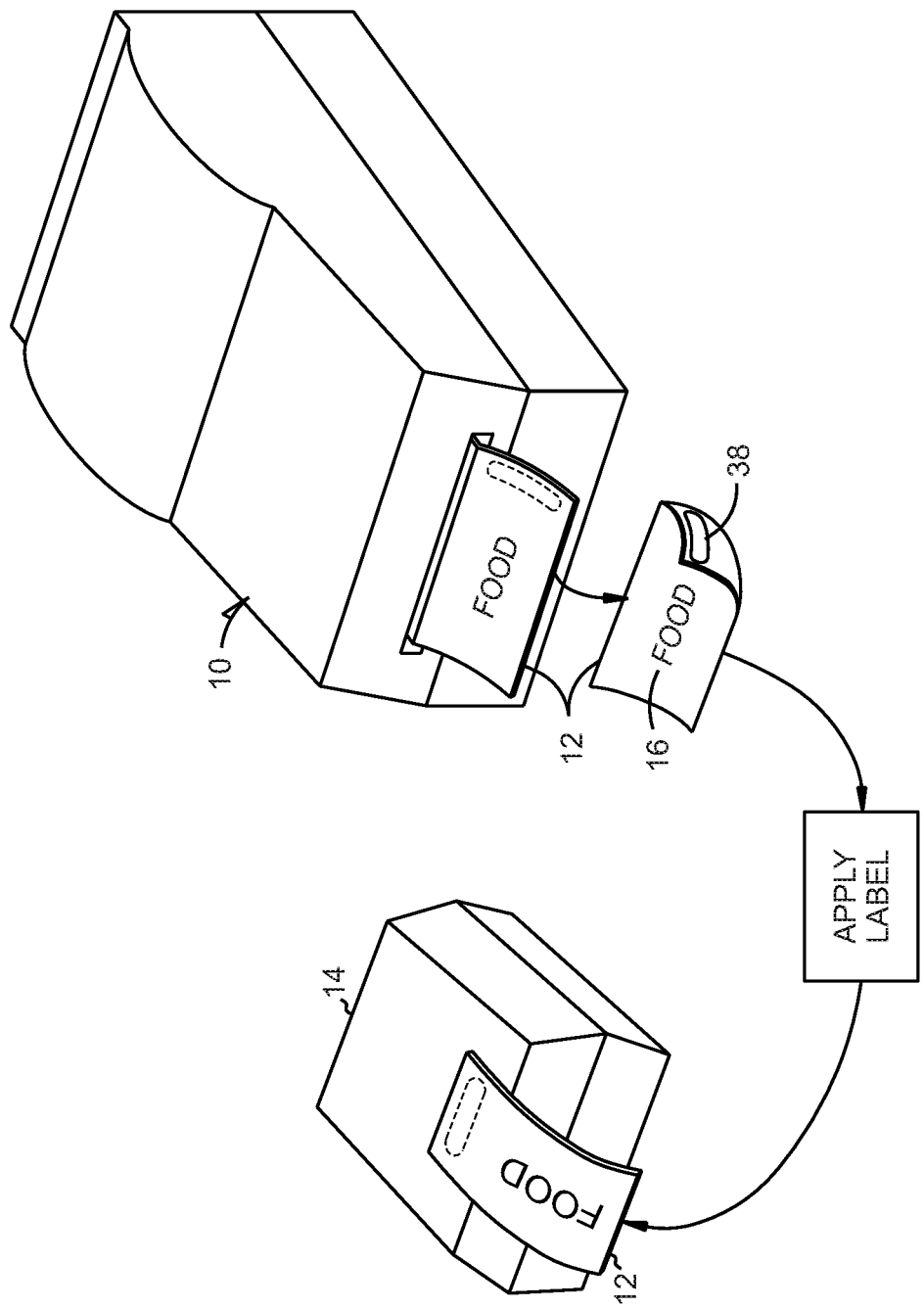
FIG. 2 is a view of a thermal printer dispensing pressure sensitive high tack adhesive labels with voids, according to an embodiment.

FIG. 2 is a view of a thermal printer dispensing pressure sensitive labels having an adhesive patch with one or more voids, according to an embodiment. With reference to FIG. 2, a printer 10 configured for printing in sequence individual labels 12 for use in a typical fast food application. For example, food may be placed in a suitable food package 14 such as the paper box illustrated, or simple wrapping paper. Printer 10 may include a thermal printer, such as a single or double-sided thermal printer (as shown in the FIG. 6).

Print or identifying indicia 16 is printed on a label 12 in printer 10 for identifying the contents of the package, for example. The individual printed label 12 may then be removed from printer 10 and applied using the adhesive patch with one or more voids 38 to the food package 14 as illustrated in the a method (12 printed from 10 to 16 to APPLY LABEL to 12 applied to 14 using 38 (adhesive patch with void)), which is shown in FIG. 2.

It is to be noted that the adhesive path with one or more voids 38 is not drawn to scale in the FIG. 2 and the patch 38 covers a greater surface area of the backside of the label 12 then what is depicted in the FIG. 2. Moreover the patch 38 includes one or more voids as illustrated in the FIGS. 1A-1C.

Figure 3:
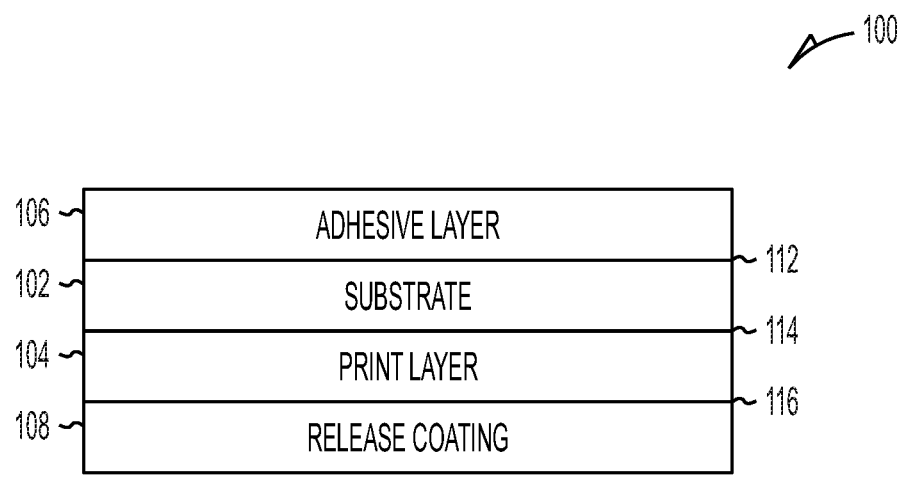
FIG. 3 is a cross-sectional view of a linerless label, according to an embodiment.
Figures 4, 5:
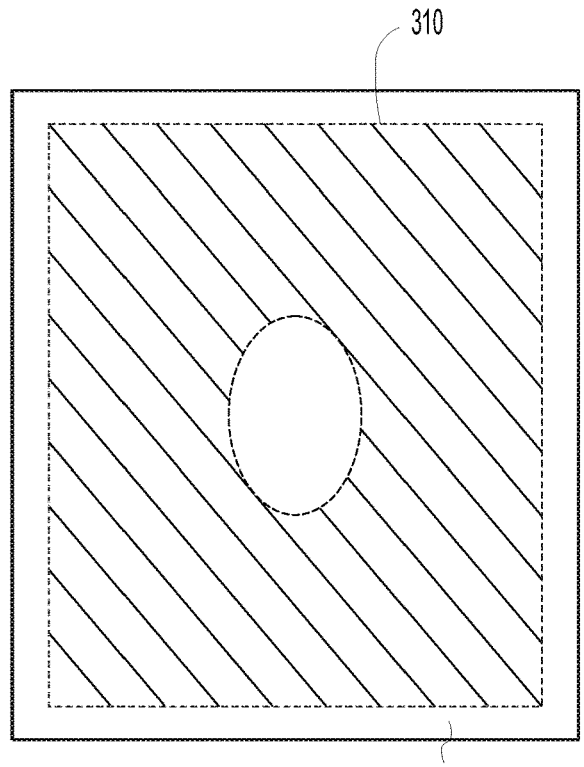
FIG. 4 is a view of a second surface of the linerless label of FIG. 3, including printed text, according to an embodiment.
FIG. 5 is a view of a first surface of the linerless label of FIG. 3, including a strip of activated adhesive with a void, according to an embodiment.

FIGS. 3-5 illustrate an example linerless label 100 that includes a printable surface including imaging material on one side and a heat-activated adhesive surface on the other side having a release coating, according to embodiments of the invention. It is to be noted that other types of labels are also envisioned.

FIG. 3 is a cross-sectional view of a linerless label having an adhesive patch with one or more voids, according to an embodiment.

With reference to FIG. 3, linerless label 100 is formed of layers including a substrate 102, a thermal print layer 104, a heat-activated adhesive layer with one or more voids 106, and a release coating 108. The adhesive layer with one or more voids 106 overlies a first surface 112 of the substrate 102 and the print layer 104 overlies a second surface 114 of the substrate 102 of the print layer 104. The release coating 108 overlies surface 116 of the print layer 104. The adhesive layer 106 having an adhesive patch comprised of an adhesive or adhesive mixture with one or more voided areas (areas devoid of any adhesive or adhesive mixture.

In some embodiments, substrates may be thermally resistant in order to prevent heat applied to one side of the substrate from activating materials on the other side of the substrate.

Linerless label 100 may be wound into a roll. The adhesive layer with one or more voids 106 comes into contact with the release coating 108, thereby minimizing adhesion between the adhesive layer 106 and the print layer 104 or underlying substrate 102.

The print layer 104 can include one or more layers of thermal imaging material. For instance, the print layer 104 can include a thermal transfer receptive coating suitable for thermal transfer printing. Alternately or additionally, the print layer 104 may include one or more thermally sensitive coatings which are adapted to change color upon application of heat thereto by which direct thermal printing is provided.

The adhesive layer with one or more voids 106 may include adhesives and may be applied in patches (in any of the manners discussed above) using a printing press.

As an alternative to using a separate print layer 104, substrate 102 could comprise thermochromic paper. A thermal print head can print visible patterns on thermochromic paper without requiring an additional print layer to be formed on the substrate.

FIG. 4 is a view of a second surface of the linerless label of the FIG. 3, including an example printed or imaged text, according to an embodiment.

That is, FIG. 4 illustrates an example of a second surface 202 of the linerless label 100 after printing. In this example, the label 100 is a receipt for a fast food meal. As shown in FIG. 3, the second surface 202 of the linerless label 100 has been printed with transaction information by, for example, direct thermal printing of one or more thermally sensitive compounds in the print layer 104.

FIG. 5 is a view of a first surface of the linerless label of FIG. 3, including a strip of activated adhesive (having at least one contiguous are devoid of any adhesive within the strip), according to an embodiment.

The first surface 302 includes a wet adhesive portion in the form of a tacky strip 310 of heat-activated adhesive material (having a void devoid of any wet adhesive portion) that has been activated by, for example, a thermal print head. In this example, the tacky strip 310 can be used to attach the receipt to an associated bag of food or a cup of coffee. Consequently, the bag or cup with the receipt can be handed to a customer simultaneously.

The tacky strip 310 can be formed in one of at least two different methods. In the first method, the entire first surface 112 of the substrate 102 can be overlaid by a heat-activated adhesive with a voided region that is dry and non-tacky prior to activation. Then, only a selected portion of the heat-activated adhesive, the portion defining the strip 310, is activated by heat applied with a thermal print head. Depending on the embodiment, such activation may occur at or substantially at the same time as, or at some time after the second surface 202 of the receipt has been printed with transaction information. In the second method, a portion of the first surface 302 defining the strip with one or more voided regions 310 can be overlaid with a heat-activated adhesive that is dry and non-tacky prior to use. The entire heat-activated adhesive can be activated by a thermal print head, which activation may, depending on the embodiment, occur at or substantially at the same time as, or at some time after the second surface 202 of the receipt has been printed with transaction information. Either manner will result in a tacky adhesive strip with one or more voided regions 310. When a double-sided thermal printer is used, a first thermal print head can print on the second surface 202 of the receipt while a second thermal print head activates the first surface 302 of the receipt.

The substrate can be paper, such as a base paper, a single layer coated paper, a several layer coated paper, a thermal coated paper, a top coated paper (over the thermal coating), film, or any other substrate that can receive coated layers.

Figure 6:
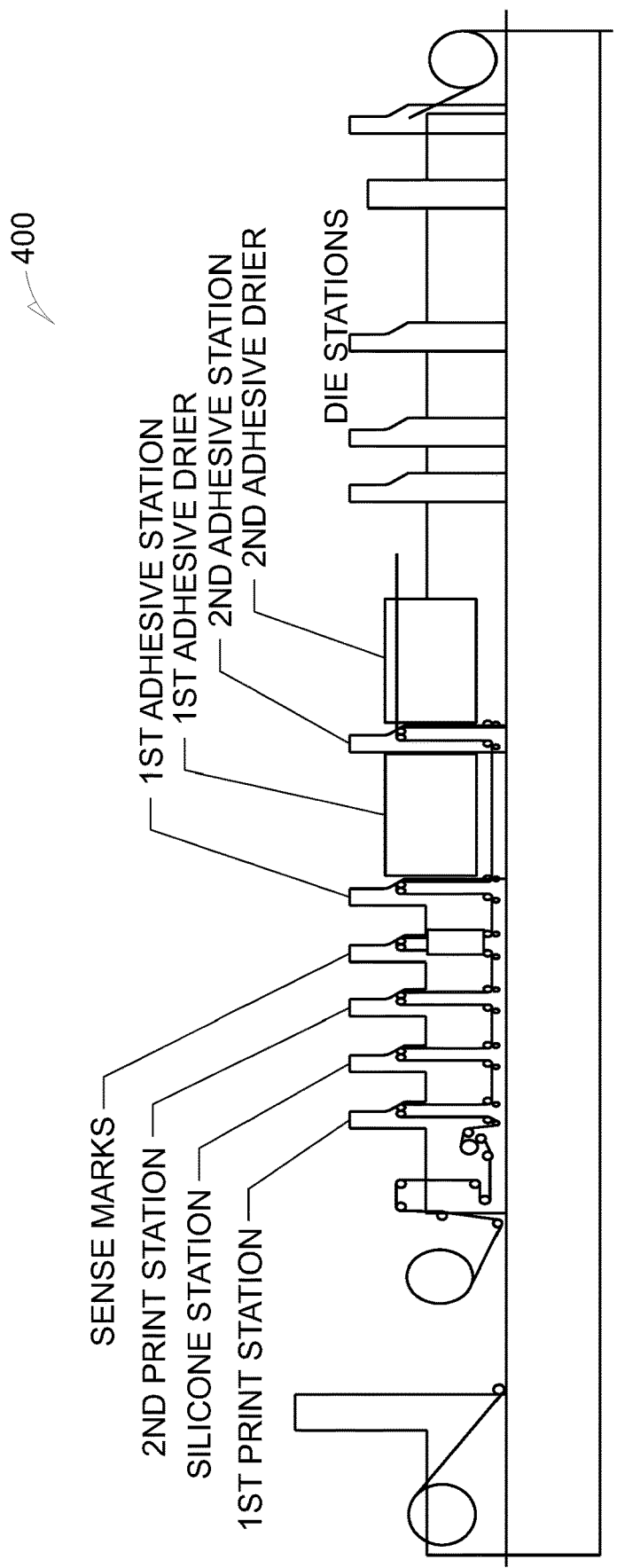
FIG. 6 is an example apparatus for applying adhesive patches with voids, according to an example embodiment.

FIG. 6 is an example apparatus for applying adhesive patches having one or more voided regions devoid of any adhesive, according to an example embodiment.

An example press 400 is illustrated. The example press is a flexographic or "flexo" printing press.

Figure 7:
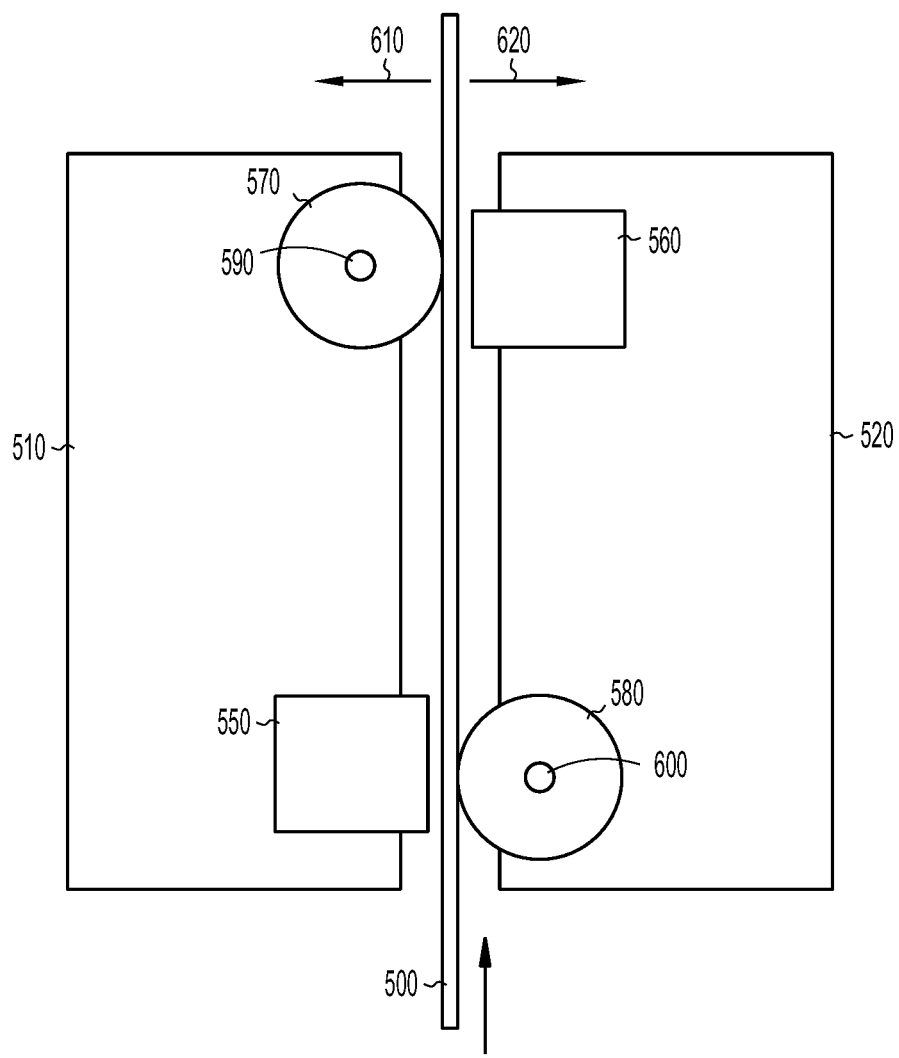
FIG. 7 is an example double-sided thermal printer for printing labels having adhesive patches with voids, according to an embodiment.

FIG. 7 is an example double-sided thermal printer for printing labels having an adhesive patch with one more voided regions devoid of any adhesive, according to an embodiment.

An example double-sided thermal printer includes a first print head assembly 510, a second print head assembly 520, and a motor. The first print head assembly 510 includes a first print head 550 and a first platen 570 rotatable about a first shaft 590. Similarly, the second print assembly 520 comprises a second print head 560 and a second platen 580 rotatable about a second shaft 600.

During operation of the double-sided thermal printer, the motor drives the first and second shafts 590 and 600 to turn the first and second platens 570 and 580. Accordingly, when a label 500 is fed into the printer, rotation of the first and second platens 570 and 580 pushes the label 500 in a direction indicated by a vertical arrow. As the label 500 passes through the printer, the first and second print heads 550 and selectively heat the two sides of label 500 to perform printing operations. More particularly, first print head 550 performs printing operations on a side of label 500 indicated by an arrow 610 and second print head 560 performs printing operations a side of label 500 indicated by an arrow 620.

In an embodiment, when the applied adhesive (having one or more void regions that are devoid of any adhesive) is applied to the substrate it can be a pressure-sensitive adhesive. In such a case, pressure can be applied to the adhesive at a customer's location for the receipt to adhere to customer items, such as, but not limited to: paper/foil wraps, cardboard boxes, clam shells, fries sleeves, cups, etc.

Although the present invention has been described with particular reference to certain preferred embodiments thereof, variations and modifications of the present invention can be effected within the spirit and scope of the following claims.

The invention claimed is:

1. An adhesive label comprising:
   a substrate;
   an adhesive region with adhesive on a first side of the substrate;
   two void regions that are devoid of any adhesive on the first side of the substrate; and
   a print layer on a second and opposing side of the substrate, wherein the print layer comprises one or more thermally sensitive coatings that changes color upon application of heat;
   wherein the two void regions are non-intersecting and staggered within the adhesive region, and edges of the adhesive region forms a border between edges of the substrate and edges of the two void regions, wherein each void region is a triangular shape, wherein a first apex of a first triangular shape for a first void region is directed in a first direction and a second apex of a second triangular shape for a second void region is directed in a second direction, wherein the first direction is an opposite direction from the second direction, wherein the first void region is adjacent to the second void region and separated by a portion of the adhesive region, and wherein a first base of the first triangular shape for the first void region is aligned horizontally with the second apex of the second triangular shape for the second void region.

2. The adhesive label of claim 1, wherein a surface area of the adhesive region within the adhesive label is greater than a surface area of the two void regions.

3. The adhesive label of claim 1, wherein the adhesive region surrounds and outlines all of the two void regions.

4. The adhesive label of claim 1, wherein a portion of the adhesive region is situated at a center of the label.

5. The adhesive label of claim 1, wherein the adhesive is one of: a high-tack adhesive, a high-tack pressure sensitive adhesive, and a pressure-sensitive adhesive.

* * * * *